United States Patent
Martin et al.

(10) Patent No.: US 11,793,111 B2
(45) Date of Patent: Oct. 24, 2023

(54) HARVESTING HEAD REEL-MOUNTED LASER MEASUREMENT

(71) Applicant: CNH Industrial America LLC, New Holland, PA (US)

(72) Inventors: Jethro Martin, Ephrata, PA (US); Cory Douglas Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 638 days.

(21) Appl. No.: 16/697,478

(22) Filed: Nov. 27, 2019

(65) Prior Publication Data
US 2021/0153435 A1    May 27, 2021

(51) Int. Cl.
| | |
|---|---|
| A01D 41/127 | (2006.01) |
| A01D 57/12 | (2006.01) |
| G01S 17/89 | (2020.01) |
| A01B 69/04 | (2006.01) |

(52) U.S. Cl.
CPC ........... *A01D 41/127* (2013.01); *A01D 57/12* (2013.01); *G01S 17/89* (2013.01); *A01B 69/008* (2013.01)

(58) Field of Classification Search
None
See application file for complete search history.

(56) References Cited

U.S. PATENT DOCUMENTS

| | | | |
|---|---|---|---|
| 5,299,413 A * | 4/1994 | Gale | A01D 41/141 56/121.46 |
| 5,715,665 A | 2/1998 | Diekhans et al. | |
| 5,752,372 A * | 5/1998 | Buermann | A01D 57/04 56/130 |
| 6,059,080 A * | 5/2000 | Lopez, Sr. | H02G 11/02 191/12.4 |
| 6,101,795 A | 8/2000 | Diekhans | |
| 6,615,570 B2 | 9/2003 | Beck et al. | |
| 9,485,912 B2 | 11/2016 | Needham et al. | |
| 9,775,290 B2 * | 10/2017 | Schleusner | G01S 7/411 |
| 2011/0209631 A1* | 9/2011 | Viaud | A01F 15/08 180/14.1 |
| 2014/0024421 A1* | 1/2014 | Flickinger | A01F 12/22 460/71 |
| 2014/0338298 A1* | 11/2014 | Jung | A01D 41/127 56/10.2 R |

(Continued)

FOREIGN PATENT DOCUMENTS

| | | | |
|---|---|---|---|
| CN | 201345827 Y | * | 11/2009 |
| CN | 206835660 U | * | 1/2018 |

(Continued)

OTHER PUBLICATIONS

Extended European Search Report for EP Applicatoin No. 20209354.8 dated Apr. 23, 2021 (four pages).

*Primary Examiner* — Jelani A Smith
*Assistant Examiner* — Jacob Daniel Underbakke
(74) *Attorney, Agent, or Firm* — Peter K. Zacharias

(57) ABSTRACT

Method and apparatus for detecting crop field parameters with a header of a harvester. The header includes a reel configured to draw crop from a crop field toward the header as the harvester moves through the crop field and at least one distance sensor mounted to the reel. Data is received from the at least one distance sensor mounted on the reel, processed, and used to detect crop field parameters.

20 Claims, 5 Drawing Sheets

(56) References Cited

U.S. PATENT DOCUMENTS

| | | | |
|---|---|---|---|
| 2015/0230393 A1* | 8/2015 | Madsen | A01C 21/00 |
| | | | 701/50 |
| 2017/0146343 A1 | 5/2017 | Matsuo et al. | |
| 2017/0235471 A1* | 8/2017 | Schøler | G06F 3/0481 |
| | | | 715/772 |
| 2018/0284758 A1* | 10/2018 | Cella | G01M 13/028 |
| 2018/0332768 A1* | 11/2018 | Isaac | A01D 41/06 |
| 2019/0021226 A1* | 1/2019 | Dima | A01D 34/006 |
| 2019/0110394 A1* | 4/2019 | VanNahmen | A01D 34/006 |
| 2019/0259108 A1* | 8/2019 | Bongartz | A01G 31/02 |
| 2019/0307070 A1* | 10/2019 | Dima | A01D 57/04 |

FOREIGN PATENT DOCUMENTS

| | | | | |
|---|---|---|---|---|
| CN | 109937708 A | * | 6/2019 | |
| CN | 110235600 A | * | 9/2019 | ........... A01D 41/127 |
| DE | 102012111029 A1 | * | 5/2014 | ............ A01B 59/00 |
| DE | 102016202628 A1 | * | 8/2017 | |
| EP | 2681984 A1 | | 1/2014 | |
| EP | 2733680 A1 | * | 5/2014 | ............ A01B 59/00 |
| EP | 3560314 A1 | | 10/2019 | |
| GB | 2173309 A | | 10/1986 | |
| JP | H06335313 A | | 12/1994 | |
| JP | H099765 A | | 1/1997 | |
| WO | WO-2019140512 A1 | * | 7/2019 | ........... A01D 41/141 |

\* cited by examiner

HARVESTING HEAD REEL-MOUNTED LASER MEASUREMENT

FIELD OF THE INVENTION

Examples of the present invention relate generally to a header of a plant cutting machine (e.g., a harvester) and, more specifically, to measuring distance and/or determining range using a reel-mounter laser system (e.g., a laser distance and ranging system; LiDAR) on a plant cutting machine.

BACKGROUND OF THE INVENTION

An agricultural harvester, e.g., a plant cutting machine, such as, but not limited to, a combine or a windrower, generally includes a header operable for severing and collecting plant or crop material ("crop") as the harvester is driven over a crop field. A reel may be mounted to the header to assist in collecting the crop by lifting the crop and/or pulling the crop toward the header for severing and collecting.

Analytical information associated with the crop and the crop field is useful for maximizing yield. Analytical information may be gathered by the harvester during current crop harvesting activities and processed for subsequent use in planting and harvesting future crops.

Harvesters are becoming increasingly automated. Aspects of the automation include automation of the driving (e.g., collision avoidance) and remote driving.

SUMMARY OF THE INVENTION

A harvesting apparatus that includes a harvester, a header coupled to the harvester, the header including a reel configured to draw crop from a crop field toward the header as the harvester moves through the crop field, at least one distance sensor positioned on the reel, each of the at least one distance sensor configured to detect distance information; and a control system configured to receive the detected distance information from the at least one distance sensor to detect at least one crop field parameter.

A method for detecting parameters of a crop field. The method includes receiving data from at least one distance sensor mounted on a reel of a harvester, processing the data from the at least one distance sensor, and detecting at least one crop field parameter from the processed data.

BRIEF DESCRIPTION OF THE DRAWINGS

For the purpose of illustration, there are shown in the drawings examples of the present invention. It should be understood, however, that the invention is not limited to the precise arrangements, dimensions, and instruments shown. Like numerals indicate like elements throughout the drawings. When more than one of the same or similar elements are depicted a common reference number may be used with a letter designation corresponding to respective elements. When the elements are referred to collectively or a non-specific element is referenced, the letter designation may be omitted. In the drawings.

DETAILED DESCRIPTION OF THE INVENTION

Figure 1:
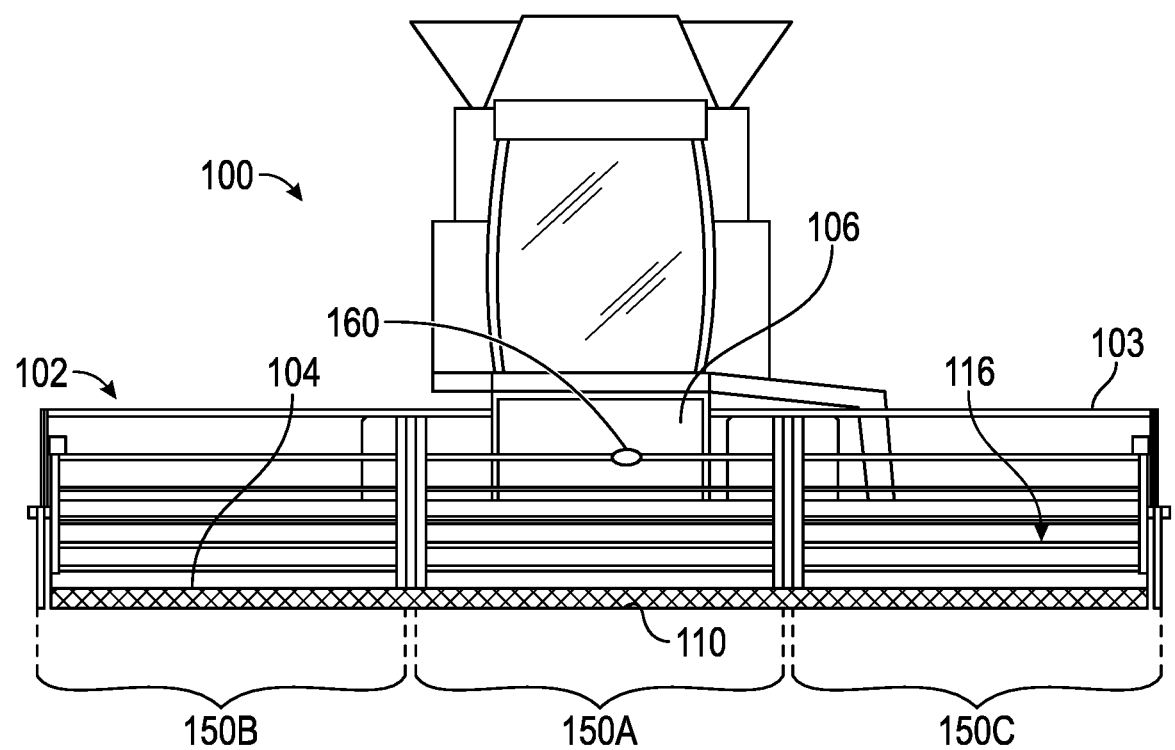
FIG. 1 is a front view of a harvester with attached header including a reel with mounted distance sensor in accordance with examples described herein.

Reference will now be made in detail to the various examples of the subject disclosure illustrated in the accompanying drawings. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "crop" and "crop material" are used throughout the specification for convenience and it should be understood that this term is not intended to be limiting. The header of the subject application is applicable to a variety of crops, including but not limited to wheat, soybeans and small grains.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the signals or light.

The term "about" as used herein when referring to a measurable value such as an amount, a temporal duration, and the like, is meant to encompass variations of ±20%, ±10%, ±5%, ±1%, or ±0.1% from the specified value, as such variations are appropriate.

The term "substantially" as used herein shall mean considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the examples of the subject disclosure may be combined in any suitable manner in one or more embodiments. One skilled in the relevant art will recognize, in light of the description herein, that the subject disclosure can be practiced without one or more of the specific features or advantages of a particular example. In other instances, additional features and advantages may be recognized in certain embodiments that may not be present in all examples of the present disclosure.

Referring now to the drawings, FIG. 1 illustrates an agricultural harvester 100 in accordance with an example of the present disclosure. For exemplary purposes only, the agricultural harvester is illustrated as a combine harvester. The harvester 100 includes a header 102 attached to a forward end of the harvester 100, which is configured to cut crops, including (without limitation) small grains (e.g., wheat, soybeans, grain, etc.), and to induct the cut crops into a feederhouse 106 as the harvester moves forward over a crop field.

The header 102 is a multi-segment header including a center segment 150A, a right wing segment 150B adjacent a right side of the center segment 150A, and a left wing segment 150C adjacent a left side of the center segment. The center segment 150A is positioned in front of the feederhouse 106 and may be raised/lowered with respect to the harvester 100. The right wing segment 150B and the left wing segment 150C may be raised/lowered to conform to the surface of the crop field. During normal operation, all three segments 150A/150B/150C are engaged in harvesting crop material from the crop field (referred to herein as the "operational state"). In certain situations, such as in an unusually wet/muddy portion of the crop field, the right and/or left wing segments 150B are raised such that they no longer effectively capture crop (referred to herein as a "raised state") in order to prevent the header 102 from getting bogged down in the crop field. Although a three-segment header is illustrated and described, the invention is equally applicable to headers having fewer segments (e.g., a single non-adjustable header, a two-segment header) or more segments.

The header 102 includes a frame 103 having a floor 104 that is supported in desired proximity to the surface of a crop field. The center, right, and left segments 150A, 150B, and 150C extend transversely along a forward edge of the floor 104, i.e., in a widthwise direction of the harvester. The center, right, and left segments 150A, 150B, and 150C are configured to cut crops in preparation for induction into the feederhouse 106. The header 102 may include one or more draper conveyor belts for conveying cut crops to the feederhouse 106, which is configured to convey the cut crops into the harvester for threshing and cleaning as the harvester 100 moves forward over a crop field.

The header 102 includes an elongated, rotatable reel 116 which extends above and in close proximity to the segments 150A, 150B, and 150C. The rotatable reel 116 is configured to cooperate with the one or more draper conveyors in conveying cut crops to the feederhouse 106 for threshing and cleaning. According to an example as shown in FIG. 1, a cutter bar 110 is positioned in front of the segments 150A, 150B, and 150C.

A distance sensor 160 is positioned on the reel 116. The distance sensor produces distance information representing a distance from the sensor 160 to an object lying in a sensing direction (point) or sensing region (line or area) capable of detection by the distance sensor 160. In one example, the distance sensor 160 is a single-beam laser distance and ranging (LiDAR) sensor. In other examples, the distance sensor 160 may be a scanning LiDAR sensor or other type of sensor capable of determining a distance to an object lying in a sensing direction or region.

Figure 2A:
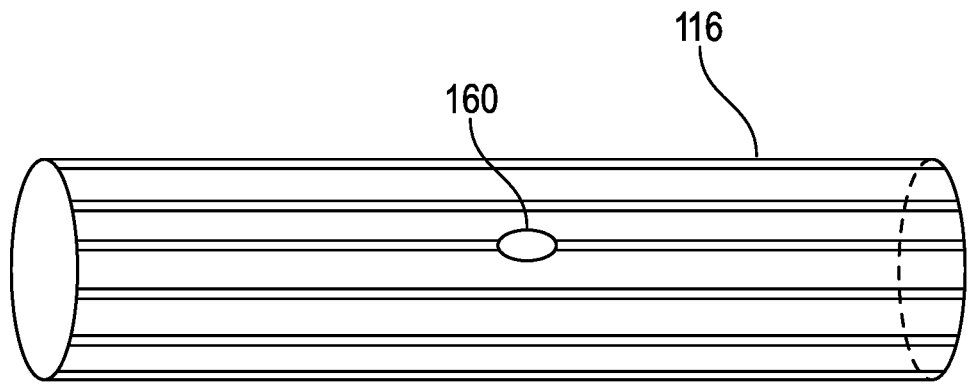
FIGS. 2A, 2B, and 2C are views of three reel-mounted sensor arrangements in accordance with examples described herein.
Figure 2B:
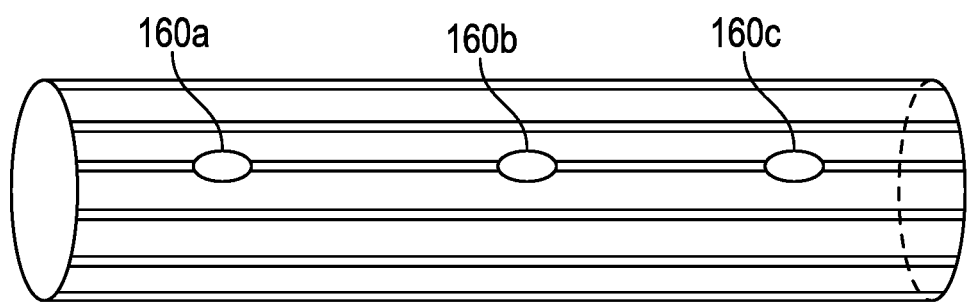
Figure 2C:
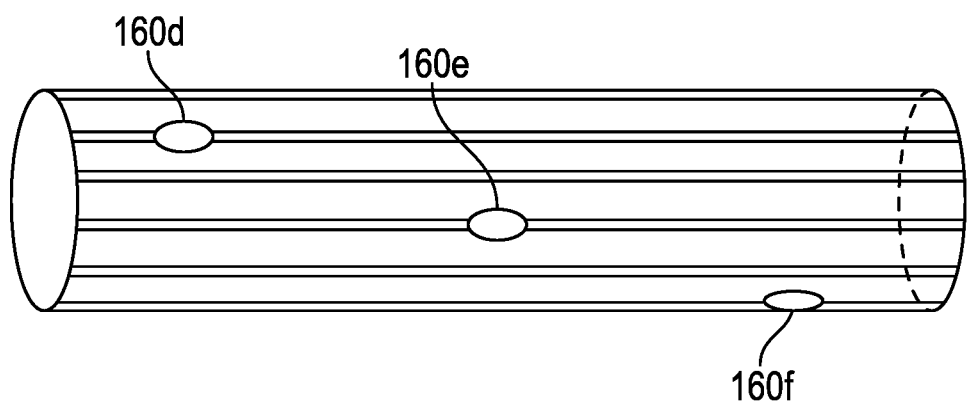

FIGS. 2A, 2B, and 2C depict a reel 116 of the header 102 with three examples of distance sensor arrangement. Although a single reel 116 is illustrated and described, the invention is applicable to headers having multiple reels (e.g., a reel associated with each segment of a multi-segment header). Additionally, other sensor arrangements will be understood by one of skill in the art from the description herein and are considered within the scope of the present disclosure.

Movement of the reel 116 on which the distance sensor 160 is mounted enables obtaining additional measurements with the distance sensor 160 than would be possible with the same sensor that was statically mounted on the harvester 100 or header 102. For example, a single-beam LiDAR sensor may obtain data about crop/objects lying in a line perpendicular to the crop field though which the harvester 100 is traveling as the sensor 160 moves in an arc with the rotation of the reel 116. This may be used to identify the height of the crop currently being harvested, to identify distance to an object in the path of the harvester, and to identify the height of the object in the harvester's path. Scanning beam distance sensors such as a scanning LiDAR sensor obtain data parallel to the crop field. This may be used to obtain data such as the width of the object, identification of multiple objects, and crop density.

In FIG. 2A, a single distance sensor 160 is mounted to the reel 116. As the reel 116 turns, the distance sensor 160 gathers distance data for crop/objects directly in front of the harvester 100 at each sensor location (e.g., for a single beam distance sensor) and directly in front and to the sides of each sensor location (e.g., for a scanning beam distance sensor).

In FIG. 2B, multiple distance sensors 160 (distance sensors 160a-c) are spaced across the reel 116 in a direction parallel to the crop field. This enables gathering of distance data having finer granularity than is available with a single sensor of the same type. As the reel 116 turns, the distance sensors 160 gathers distance data for crop/objects directly in front of the harvester 100 at each sensor location (e.g., for a single beam distance sensor) and directly in front and to the sides of each sensor location (e.g., for a scanning beam distance sensor).

In FIG. 2C, multiple distance sensors 160 (distance sensors 160d-f) are spaced around the reel 116 in a circumferential direction. This enables gathering of distance data having finer granularity in time than is available with a single sensor of the same type since there is less time between sensors pointing in the direction of travel (e.g., as opposed to up/down/backward with respect to the direction of travel. As the reel 116 turns, the distance sensors 160 gather distance data for crop/objects directly in front of the harvester 100 at each sensor location (e.g., for a single beam distance sensor) and directly in front and to the sides of each sensor location (e.g., for a scanning beam distance sensor).

Figure 3:
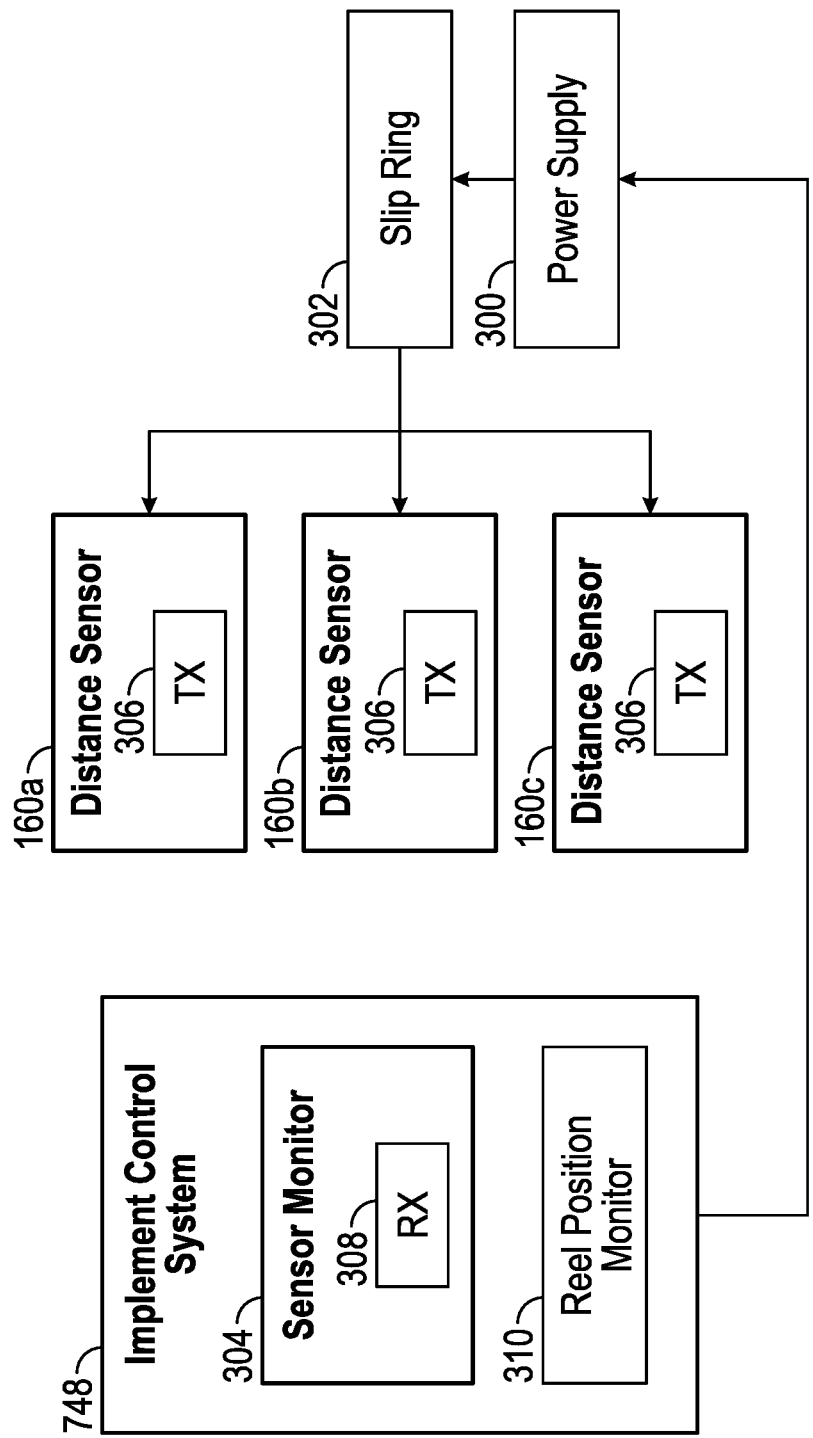
FIG. 3 is a block diagram of a control system in accordance with examples described herein.

FIG. 3 depicts a control system for gathering distance data using reel-mounted distance sensors 160 (distance sensors 160a-c in this example). A power supply 300 supplies power to the distance sensors 160. The power supply 300 may be a power supply of the harvester 100. The power supply 300 supplies power the distance sensors 160 through a slip ring 302 mounted near an axis of rotation of the reel 116. In other examples, the distance sensors 160 may include their own power supply or an adjacent power supply such as a battery or a kinetic energy source that produces power from the rotation of the sensor about the axis of rotation of the reel 116. In examples where the power supply 300 is part of the distance sensor 160 or is adjacent the distance sensors, the slip right 302 may be omitted.

In one example, the distance sensors 160 include a transmitter 306 for wirelessly transmitting distance data collected by the distance sensors. In another example, the distance data is transmitted through a wired connection (e.g., through the slip ring 302).

An implement control system 748 (see FIG. 7 and related discussion) includes a sensor monitor 304 and a reel positioned monitor 310. The sensor monitor 304 monitors distance data received from the distance sensors. In an example, the sensor monitor 304 includes a receiver 308 for wirelessly receiving distance data transmitted by the distance sensors. In another example, the distance data is received through a wired connection (e.g., through the slip ring 302).

The reel position monitor 310 monitors the orientation of the reel 116 relative to the sensor(s) 160 mounted on the reel to determine orientation of the at least one sensor. The reel position monitor 310 may monitor an indexing signal generated by the reel 116 that corresponds to the current orientation of the sensor(s). The reel position monitor 310 may then track the position of the reel/sensor(s) as the reel rotates (e.g., based on a rotation rate of the reel 116)

Figure 4:
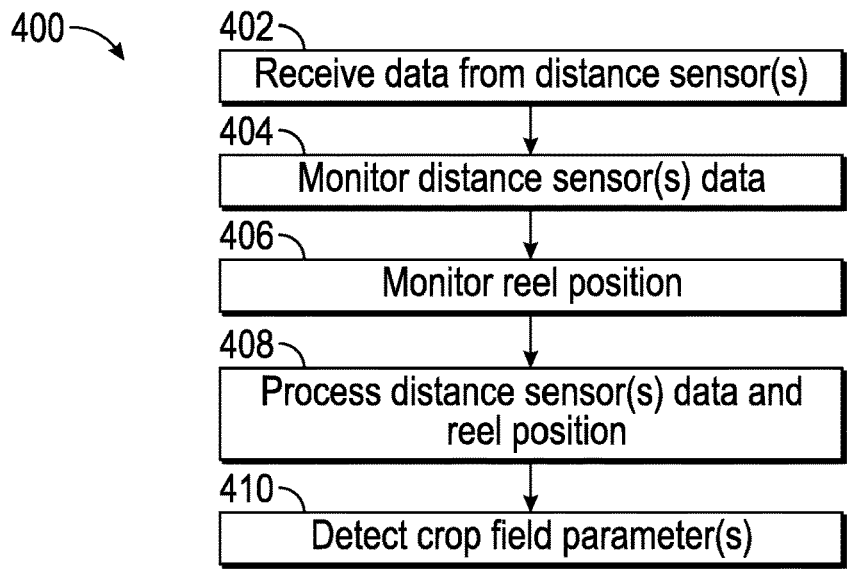
FIGS. 4, 5, and 6 are flow chart for detecting crop field parameters, adjusting vehicle operation, and controlling distance sensors, respectively, in accordance with examples described herein.
Figure 5:
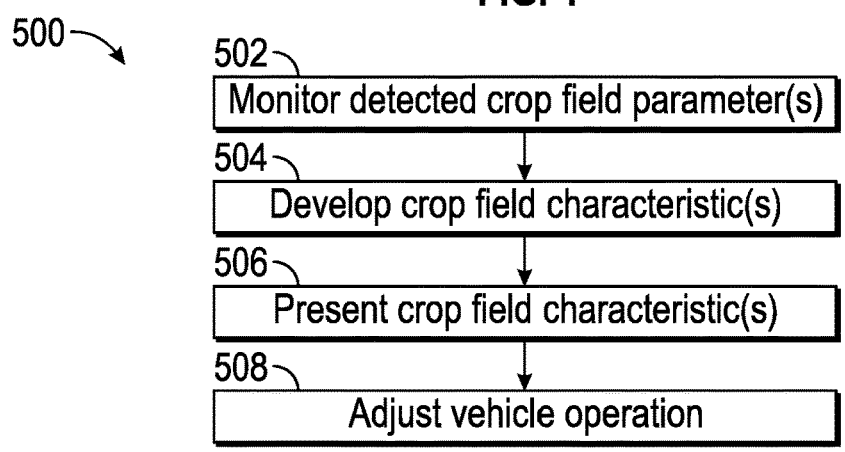
Figure 6:
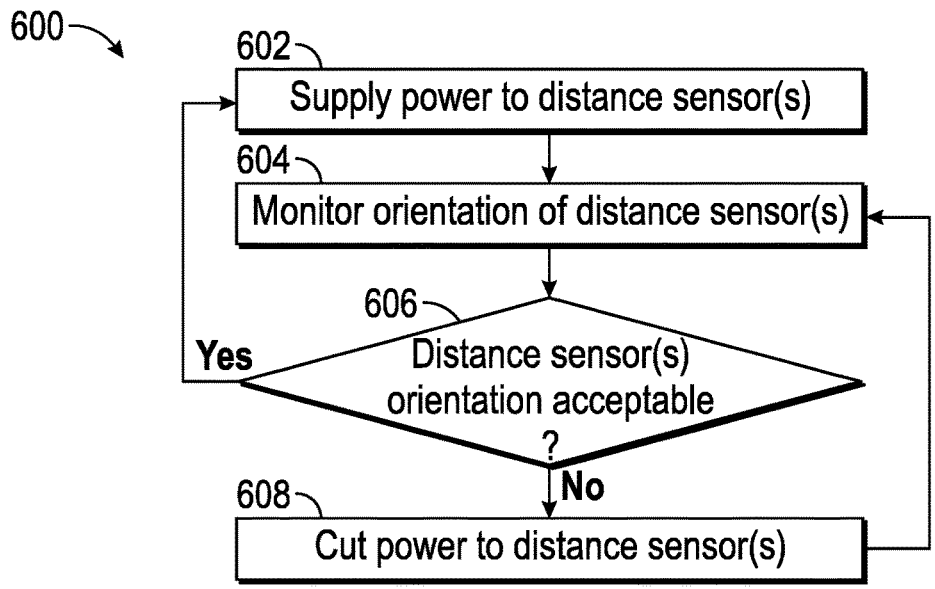

FIGS. 4, 5, and 6 are flow chart for detecting crop field parameters, adjusting vehicle operation, and controlling distance sensors, respectively. The steps are described with reference to hardware described herein, but are not to be limited to such implementations. Although shown as occurring serially, the blocks of FIGS. 4, 5, and 6 may be reordered or parallelized depending on the implementation. Furthermore, one of skill in the art will understand from the description herein that one or more steps/blocks may be omitted and one or more additional/alternative steps may be incorporated.

FIG. 4 depicts a flow chart 400 of example steps for detecting crop field parameters (e.g., harvest crop height and obstacles in the crop field). At block 402, receive the distance data from one or more the distance sensors 160. For a single beam distance sensor, the received distance data includes distance from a respective sensor to a detected object/crop and a time stamp associated with the collection of the distance data. For a scanning beam distance sensor, the received data additionally includes an angular parameter that can be used to determine the direction the beam was pointing when the distance was data was collected, the distance from the harvester 100 to the obstacle and the position of the obstacle on the horizon with respect to the harvester 100.

At block 404 and block 406, monitor the distance sensor data received from the distance sensors and the reel position, respectively. The sensor monitor 304 and the reel position monitor 310 may monitor the distance sensor data and the reel position, respectively.

At block 408 and block 410, process the monitored distance sensor data and the reel position are processed to detect crop field parameters. The implement control system 748 may process the monitored distance sensor data and the reel position are processed to detect crop field parameters. To detect crop height using a single beam distance sensor, the implement control system may determine the orientation of the distance sensor when the distance measurement abruptly decreases (indicating sensor is heading into crop).

To detect an obstacle, the implement control system may determine when a distance measurement is relatively long, e.g., 10 feet to 100 feet, and the height is above the detected crop height, e.g., another harvester in the crop field or a fence on the perimeter of the crop field. By incorporating distance measurements from other distance sensors and/or scanning sensors, additional crop field parameters can be detected.

FIG. 5 depicts a flow chart 500 of example steps for adjusting vehicle operation responsive to crop field parameters detected based on distance measurements from a reel-mounted distance sensor. At block 502, monitor detected crop field parameters. Controller 750 of the harvester 100 and/or controller 776 of a base station 774 (see FIG. 7 and related description) may monitor crop field parameters detected by implement control system 748.

At block 504, develop crop field characteristics. Controller 750 of the harvester 100 and/or controller 776 of a base station 774 may develop crop field characteristics. GPS data from spatial locating device 742 may be combined with crop field characteristics to generate a map of yield characteristics, obstacles, and/or boundaries of the crop field.

At block 506, present crop field characteristics. Operator interface 752 of harvester 100 and/or operator interface 786 of base station 774 may present crop field characteristics.

At block 508, adjust vehicle operation. In one example vehicle operation is adjusted manually by an operator in the harvester 100 via operation interface 752 or in the base station 774 via operator interface 786. In another example, vehicle operation is adjusted automatically, e.g., by controller 750. For example, controller 750 may halt the harvester 100 or reroute the harvester 100 to avoid collision with an obstacle. In another example, controller 750 may increase speed of the harvester if crop density is low and may decrease speed when crop density is high.

FIG. 6 depicts a flow chart 600 of example steps for powering distance sensors, e.g., to comply with industry rules and regulations. At block 602, supply power to the distance sensor(s) 160. Implement control system 748 may supply power from power supply 300 to the distance sensor (s) 160 via slip ring 302.

At block 604, monitor orientation of the distance sensor (s) 160. Implement control system 748 may monitor orientation of the distance sensor(s) 160 based on information from reel position monitor 301.

At block 606, a decision is made regarding whether the orientation of the distance sensor is acceptable. For example, if the distance sensor orientation is determined to be in a direction that is generally in the harvester's direction of travel, the orientation is acceptable. On the other hand, if the distance sensor orientation is determined to be generally upward, perpendicular to the crop field, the orientation is unacceptable (e.g., because it could interfere with overhead aircraft.

If the orientation is acceptable, processing proceeds at block 602 with power continuing to be supplied to the distance sensor. If the orientation is unacceptable, processing proceeds at block 604 with power cut from the distance sensor at block 608. After power is cut, processing proceeds at block 604 with the orientation of the distance sensors monitored and the power withheld from the distance sensor until the orientation is again determined to be acceptable.

Figure 7:
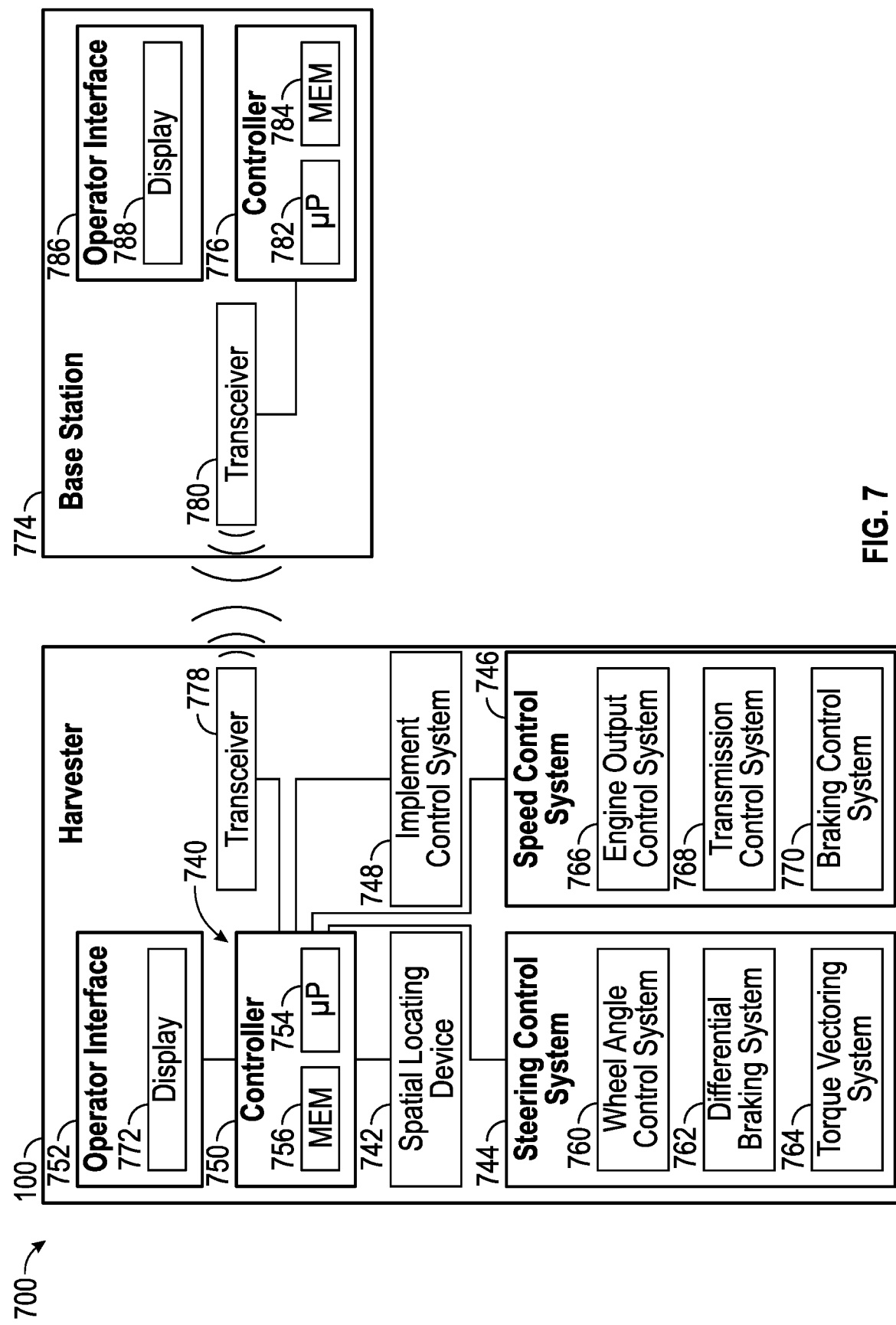
FIG. 7 is a block diagram depicting components for use in implementing apparatus and examples described herein.

FIG. 7 is a schematic diagram of an embodiment of a control system 700 that may be utilized to control the harvester 100, control the header 102, and/or detected crop field parameters (e.g., by implementing algorithms such as the algorithms depicted and described with reference to FIGS. 4, 5, and 6). In the illustrated example, the control system 700 includes a vehicle control system 740 (e.g., mounted on the harvester 100). In the illustrated embodiment, the harvester 100 includes a spatial locating device 742, which is mounted to the harvester 100 and is configured to determine a position of the harvester 100. The spatial locating device 742 may also be configured to determine a heading and/or a speed of the harvester 100, for example. As will be appreciated, the spatial locating device 742 may include any suitable system configured to determine the position and/or other characteristics of the harvester 100, such as a global positioning system (GPS) or global navigation satellite system (GNSS), for example. In certain examples, the spatial locating device 742 may be configured to determine the position and/or other characteristics of the harvester 100 relative to a fixed point within the field (e.g., via a fixed radio transceiver). Accordingly, the spatial locating device 742 may be configured to determine the position of the harvester 100 relative to a fixed global coordinate system (e.g., via the GPS or GNSS) or a fixed local coordinate system.

In the illustrated example, the harvester 100 includes a steering control system 744 configured to control a direction of movement of the harvester 100, and a speed control system 746 configured to control a speed of the harvester 100. In addition, the harvester 100 includes an implement control system 748 configured to control operation of an implement (operational state of the header segments 150) and to determine crop field parameters from distance sensors positioned on the reel 116 of header 102. Furthermore, the control system 740 includes a controller 750 communicatively coupled to the spatial locating device 742, to the steering control system 744, to the speed control system 746, and to the implement control system 748.

In some examples, the controller 750 is configured to receive a first signal indicative of a position of the harvester 100 (e.g., from the spatial locating device 742) and to receive a second signal indicative of the desired path (e.g., input by the operator via an operator interface 752). In some examples, the controller 750 may receive additional signals indicative of characteristics of the harvester 100 (e.g., current speed, turning radius limits, steering angle limits, steering angle rate limits, steering angle, roll, pitch, rotational rates, acceleration, or any combination thereof). In certain embodiments, the controller 750 may be configured to calculate a target position along a desired path. As discussed below, the controller 750 may be configured to calculate a virtual path between the current position and the target position 20, and to output a third signal indicative of an initial curvature of the virtual path. The third signal may be provided to the steering control system 744, which is configured to adjust the steering angle of the harvester 100 based on the initial curvature to guide the harvester 100 toward the desired path. The controller 750 may iteratively calculate the target position and/or the virtual paths and adjust the steering angle based on the respective initial curvature of each virtual path as the harvester 100 moves toward the desired path. In some examples, the controller 750 may iteratively calculate virtual paths at intervals less than or equal to approximately 0.01, 0.02, 0.03, 0.04, 0.05, or 0.1 seconds.

In some examples, the controller 750 is an electronic controller having electrical circuitry configured to process data from the spatial locating device 742, among other components of the harvester 100. In the illustrated example, the controller 750 includes a processor, such as the illustrated microprocessor 754, and a memory device 756. The controller 750 may also include one or more storage devices and/or other suitable components. The processor 754 may be used to execute software, such as software for calculating the target position, iteratively calculating virtual paths, controlling the harvester 100, and so forth. Moreover, the processor 754 may include multiple microprocessors, one or more "general-purpose" microprocessors, one or more special-purpose microprocessors, and/or one or more application specific integrated circuits (ASICS), or some combination thereof. For example, the processor 754 may include one or more reduced instruction set (RISC) processors.

The memory device 756 may include a volatile memory, such as random access memory (RAM), and/or a nonvolatile memory, such as ROM. The memory device 756 may store a variety of information and may be used for various purposes. For example, the memory device 56 may store processor-executable instructions (e.g., firmware or software) for the processor 754 to execute, such as instructions for calculating the target position, iteratively calculating virtual paths, and/or controlling the harvester 100. The storage device (s) (e.g., a nonvolatile/non-transitory storage medium) may include read-only memory (ROM), flash memory, a hard drive, or any other suitable optical, magnetic, or solid-state storage medium, or a combination thereof. The storage device (s) may store data (e.g., field maps, maps of desired paths, vehicle characteristics, etc.), instructions (e.g., software or firmware for calculating the target position, iteratively calculating virtual paths, controlling the harvester, etc.), detection crop field parameters and any other suitable data.

As shown, the steering control system 44 includes a wheel angle control system 760, a differential braking system 762, and a torque vectoring system 764 that may be used to steer (e.g., adjust the steering angle) the harvester 100, in accordance with the disclosed embodiments. The wheel angle control system 760 may automatically rotate one or more wheels or tracks of the harvester 100 (e.g., via hydraulic actuators) to steer the harvester 100 based at least in part on the initial curvature of the virtual path. By way of example, the wheel angle control system 60 may rotate front wheels/tracks, rear wheels/tracks, and/or intermediate wheels/tracks of the harvester 100, either individually or in groups. The differential braking system 62 may independently vary the braking force on each lateral side of the harvester 100 to direct the harvester 100. Similarly, the torque vectoring system 764 may differentially apply torque from the engine to wheels and/or tracks on each lateral side of the harvester 100. While the illustrated steering control system 744 includes the wheel angle control system 760, the differential braking system 762, and the torque vectoring system 764, it should be appreciated that alternative embodiments may include one or two of these systems, in any suitable combination. Further embodiments may include a steering control system 744 having other and/or additional systems to facilitate directing the harvester 100 based at least in part on respective initial curvatures of the iteratively calculated virtual paths (e.g., an articulated steering system, differential drive system, etc.), for example.

In the illustrated example, the speed control system 746 includes an engine output control system 766, a transmission control system 768, and a braking control system 770. The engine output control system 766 is configured to vary the output of the engine to control the speed of the harvester 100. For example, the engine output control system 766 may vary a throttle setting of the engine, a fuel/air mixture of the engine, a timing of the engine, and/or other suitable engine parameters to control engine output. In addition, the transmission control system 768 may adjust gear selection within a transmission to control the speed of the harvester 100. Furthermore, the braking control system 770 may adjust braking force, thereby controlling the speed of the harvester 100. While the illustrated speed control system 746 includes the engine output control system 66, the transmission control system 768, and the braking control system 770, it should be appreciated that alternative embodiments may include one or two of these systems, in any suitable combination. Further embodiments may include a speed control system 746 having other and/or additional systems to facilitate adjusting the speed of the harvester 100.

The implement control system 748 is configured to control various parameters of the agricultural implement towed by or integrated within the harvester 100. For example, in certain examples, the implement control system 748 may be configured to instruct an implement controller (e.g., via a communication link, such as a CAN bus or ISOBUS) to adjust a penetration depth of at least one ground engaging tool of the agricultural implement, which may reduce the draft load on the harvester 100. Furthermore, the implement control system 48 may instruct the implement controller to transition the agricultural implement between a working position and a transport portion, to adjust a flow rate of product from the agricultural implement, to adjust a position of a header of the agricultural implement (e.g., a harvester, etc.), or to adjust which segments of a multi-segment header are operations/non-operational, among other operations.

In the illustrated example, the operator interface 752 may be communicatively coupled to the controller 750. The operator interface 752 is configured to present data from the harvester 100 and/or the agricultural implement to an operator (e.g., data associated with operation of the harvester 100, data associated with operation of the agricultural implement, a position of the harvester 100, a speed of the harvester 100, the desired path, the virtual paths, the target position, the current position, etc.) via a display 772. The operator interface 752 may also be configured to enable an operator to control certain functions of the harvester 100 (e.g., starting and stopping the harvester 100, inputting the desired path, etc.). In some examples, the operator interface 752 may enable the operator to input parameters that cause the controller 750 to adjust the virtual paths. For example, the operator may provide an input requesting that the desired path be acquired as quickly as possible, that the speed of the harvester 100 remain within certain limits, or the like. In addition, the operator interface 752 (e.g., via the display 772, via an audio system, etc.) may be configured to alert an operator of error conditions, for example.

It should be appreciated that in certain embodiments, the control system 40 may include a base station 774 having a base station controller 776 located remotely from the harvester 100. For example, in certain examples, control functions of the control system may be distributed between the controller 750 of the harvester 100 and the base station controller 776. In some examples, the base station controller 776 may perform a substantial portion of the control functions of the control system. For example, in some examples, a first transceiver 778 positioned on the harvester 100 may output signals indicative of vehicle characteristics (e.g., the speed, maximum turning rate, minimum turning radius, steering angle, roll, pitch, rotational rates, acceleration, or any combination thereof), the position, and/or the heading of the harvester 100 to a second transceiver 780 at the base station 774. In such examples, the base station controller 776 may iteratively calculate virtual paths and output control signals to control the steering control system 744, the speed control system 746, and/or the implement control system 748 to direct the harvester 100 toward the desired path, for example. The base station control 776 may have a processor 782 and memory device 784 having all or some of the features and/or capabilities of the processor 754 and the memory device 756 discussed above. In some examples, the base station 774 may include an operator interface 786 having a display 788, which may have all or some of the features and/or capabilities of the operator interface 752 and the display 772 discussed above.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A harvesting apparatus comprising:
   a harvester;
   a header coupled to the harvester, the header including a reel configured to draw crop from a crop field toward the header as the harvester moves through the crop field;
   at least one distance sensor positioned on the reel, each of the at least one distance sensor configured to detect distance information; and
   a control system configured to receive the detected distance information from the at least one distance sensor to detect at least one crop field parameter,
   wherein the reel is rotatable, the at least one distance sensor is positioned on the rotatable reel, and the control system comprises:
   a sensor monitor configured to receive the detected distance information from the at least one distance sensor; and
   a reel position monitor configured to determine orientation of the at least one distance sensor;
   wherein the at least one distance sensor gathers distance information for objects in front of the harvester.

2. The apparatus of claim 1, wherein each of the at least one distance sensor is a single beam laser distance and ranging (LiDAR) sensor.

3. The apparatus of claim 1, wherein the control system is further configured to determine if the orientation of the at least one distance sensor is acceptable and to control the at least one distance sensor responsive to the determination if the orientation is acceptable.

4. The apparatus of claim 3, wherein the orientation is not acceptable when the at least one distance sensor is directed perpendicular to the crop field in an upward direction.

5. The apparatus of claim 1, wherein the at least one distance sensor includes a wireless transmitter, the sensor monitor includes a wireless receiver, and the detected distance information is communicated wirelessly from the at least one distance sensor to the sensor monitor.

6. The apparatus of claim 1, further comprising:
   a power source coupled to the header; and
   a slip ring assembly coupled to the reel between the power source and the at least one distance sensor.

7. The apparatus of claim 1, wherein the reel has an axis of rotation and wherein the at least one sensor comprises a plurality of sensors spaced across the reel in a direction parallel to the axis of rotation.

8. The apparatus of claim 7, wherein the plurality of sensors is further spaced in a circumferential direction around the axis of rotation.

9. A method for detecting parameters of a crop field, the method comprising:
receiving data from at least one distance sensor mounted on a reel of a harvester;
processing the data from the at least one distance sensor using a processor;
detecting at least one crop field parameter from the processed data using the processor; and
adjusting operation of the harvester using the processor in response to the detected at least one crop field parameter by halting the harvester or adjusting the speed of the harvester,
wherein the reel is rotatable and the at least one distance sensor is mounted on the rotatable reel, the method further comprising:
monitoring the data received from the at least one distance sensor; and
monitoring position of the rotatable reel relative to the at least one sensor mounted on the rotatable reel to determine orientation of the at least one sensor;
wherein the at least one distance sensor gathers distance information for objects in front of the harvester.

10. The method of claim 9, wherein each of the at least one distance sensor is a single beam laser distance and ranging (LiDAR) sensor.

11. The method of claim 9, wherein the receiving step comprises: wirelessly receiving the data from the at least one distance sensor.

12. The method of claim 9, further comprising:
determining if the orientation of the at least one distance sensor is acceptable; and
controlling the at least one distance sensor responsive to the determination if the orientation is acceptable.

13. The method of claim 12, wherein the controlling comprises:
turning off the at least one distance sensor when the at least one distance sensor is directed perpendicular to the crop field in an upward direction.

14. The method of claim 9, wherein the monitoring the data from the at least one distance sensor comprises:
wirelessly transmitting distance information from the at least one distance sensor;
wirelessly receiving the transmitted distance information at a sensor monitor.

15. The method of claim 9, wherein the reel has an axis of rotation and wherein the at least one sensor comprises a plurality of sensors spaced across the reel in a direction parallel to the axis of rotation.

16. The method of claim 15, wherein the plurality of sensors is further spaced in a circumferential direction around the axis of rotation.

17. A non-transitory computer-readable medium storing program code for use with a header of a harvester, the header including a reel configured to draw crop from a crop field toward the header as the harvester moves through the crop field, the program code, when executed, is operative to cause a computing device to perform the steps of:
receiving data from at least one distance sensor mounted on the reel of the harvester;
processing the data from the at least one distance sensor;
detecting at least one crop field parameter from the processed data; and
adjusting operation of the harvester in response to the detected at least one crop field parameter by halting the harvester or adjusting the speed of the harvester;
wherein the reel is rotatable and the at least one distance sensor is mounted on the rotatable reel, the steps further comprising:
monitoring the data received from the at least one distance sensor; and
monitoring position of the rotatable reel relative to the at least one sensor mounted on the rotatable reel to determine orientation of the at least one sensor,
wherein the at least one distance sensor gathers distance information for objects in front of the harvester.

18. The non-transitory computer-readable medium of claim 17, wherein the program code, when executed, is further operative to cause the computing device to perform the steps of:
determining if the orientation of the at least one distance sensor is acceptable; and
controlling the at least one distance sensor responsive to the determination if the orientation is acceptable.

19. The non-transitory computer-readable medium of claim 18, wherein the program code, when executed, is further operative to cause the computing device to perform the step of:
turning off the at least one distance sensor when the at least one distance sensor is directed perpendicular to the crop field in an upward direction.

20. The non-transitory computer-readable medium of claim 17, wherein the program code, when executed, is further operative to cause the computing device to perform the steps of:
wirelessly transmitting distance information from the at least one distance sensor;
wirelessly receiving the transmitted distance information at a sensor monitor.

* * * * *